United States Patent [19]
Bialek et al.

[11] Patent Number: 5,897,905
[45] Date of Patent: Apr. 27, 1999

[54] FOOD DRESSING

[75] Inventors: Jadwiga Bialek, Kempston, United Kingdom; Bertus Marinus van Bogegom, Vlaardingen; Nanneke Joke de Fouw, Delft, both of Netherlands; Malcolm Glyn Jones, Bedford, United Kingdom

[73] Assignee: Thomas J. Lipton Co., Division of Conopco, Inc., Englewood Cliffs, N.J.

[21] Appl. No.: 08/729,925

[22] Filed: Oct. 15, 1996

[30] Foreign Application Priority Data

Oct. 17, 1995 [EP] European Pat. Off. ............. 95307387

[51] Int. Cl.$^6$ ....................................................... A23D 9/02
[52] U.S. Cl. ............................................. 426/602; 426/601
[58] Field of Search ..................... 426/613, 605, 426/602, 601

[56] References Cited

U.S. PATENT DOCUMENTS

| | | | |
|---|---|---|---|
| 3,892,873 | 7/1975 | Kolen | 426/613 |
| 4,352,832 | 10/1982 | Wood et al. | 426/589 |
| 5,080,921 | 1/1992 | Reimer | 426/605 |
| 5,139,811 | 8/1992 | Singer | 426/605 |
| 5,194,270 | 3/1993 | Cante et al. | 426/74 |

FOREIGN PATENT DOCUMENTS

| | | |
|---|---|---|
| 250 623 | 1/1988 | European Pat. Off. |
| 468 560 | 1/1992 | European Pat. Off. |
| 496 118 | 7/1992 | European Pat. Off. |
| 603 980 | 6/1994 | European Pat. Off. |
| 603 981 | 6/1994 | European Pat. Off. |
| 617 889 | 10/1994 | European Pat. Off. |
| 6-054662 | 3/1994 | Japan . |
| WO 94/15477 | 7/1994 | WIPO . |

OTHER PUBLICATIONS

International Search Report in International Patent Application PCT/EP96/04090.

Derwent Abstract of JP 06/054662.

"When Protein and the Properties of Salad Dressing" in Deutsche Milchwirtschaft, 1993, 44(21) p. 1054, by G. Muschiolik et al.

"Investigation of the Function of Whey Protein Preparations in Oil–In–Water Emulsions", by G. Muschiolik et al., from Proc. Food Macromolecules and Colloids Symposium, 1994, Dijon.

"Heat Stability of Oil–In–Water Emulsions Containing Milk Proteins: Effect of Ionic Strength and pH", by Hunt and Dalgleish, in the Journal of Food Science, vol. 60, No. 5, 1995, p. 1120.

European Search Report in European Patent Application EP 95307387.

*Primary Examiner*—Carolyn Paden
*Attorney, Agent, or Firm*—James J. Farrell

[57] ABSTRACT

Process for the preparation of water continuous emulsions, containing 10 to 60 wt. % of dispersed oil. The emulsion contains protein obtained from egg, milk, vegetables or fruit, but no substantial amounts of polysaccharide thickeners. The process comprises the following steps (not necessarily in the indicated order) a. dispersing or dissolving the protein in either an aqueous phase or an oil phase, b. mixing the aqueous phase and the oil phase so that a coarse emulsion comprising oil droplets results, c. homogenizing the emulsion until the [$D_{3,2}$] size of at least 95% of the oil droplets is less than 5 $\mu$m, d. acidifying the emulsion until a pH 3.5 to 4.5 is attained, e. adding, under shear conditions, an aqueous electrolyte solution to the emulsion having a temperature of 10° to 55° C. The electrolyte addition causes flocculation of the emulsion. This flocculation increases the viscosity and imparts an attractive texture to the food dressing.

8 Claims, 1 Drawing Sheet

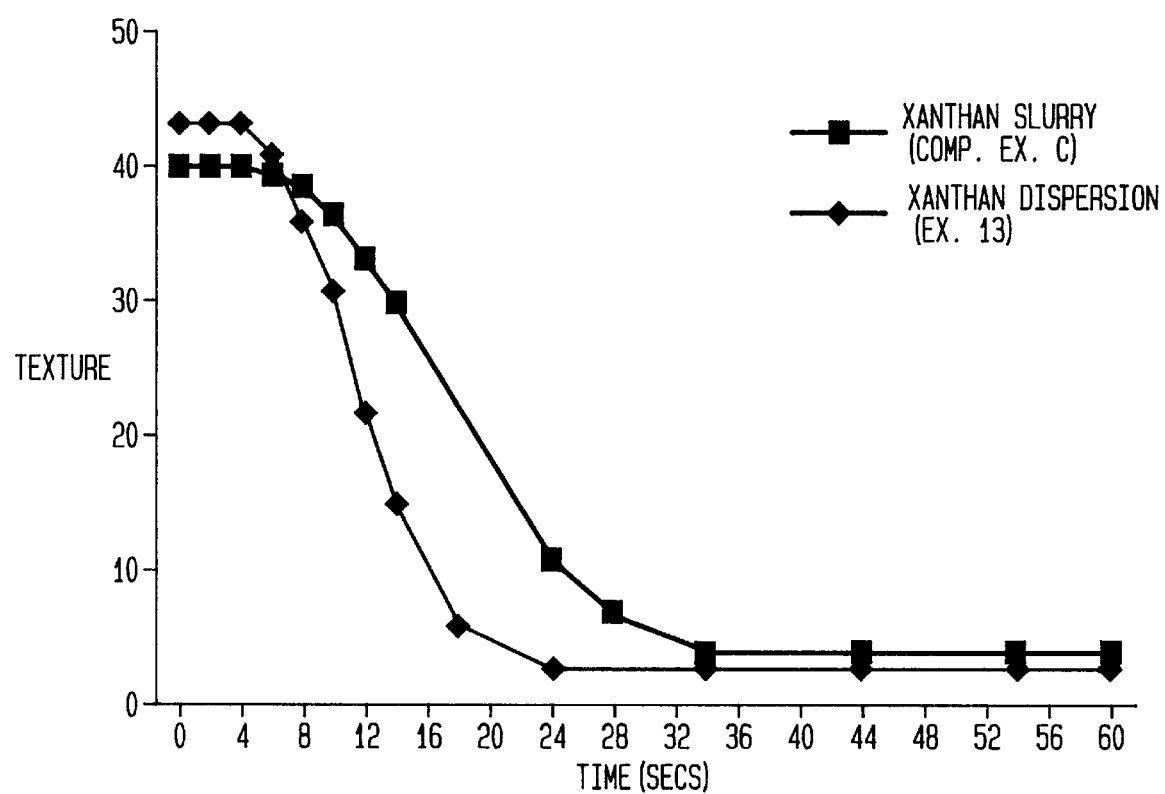

FOOD DRESSING

The present invention relates to the preparation of a food dressing, particularly of low fat food dressings having a reduced number of auxiliary ingredients.

BACKGROUND OF THE INVENTION

Mayonnaise is a water continuous emulsion, containing 80 wt. % of dispersed oil. In order to impart proper stability and texture to mayonnaises with a reduced fat content, particularly 40 wt. % or less, it is necessary to incorporate auxiliary ingredients in the mayonnaise, particularly lipid emulsifiers and polysaccharide thickeners, such as gums and starch derivatives. Often, however, the thickeners have an adverse effect on taste and mouthfeel. Moreover, such auxiliary ingredients have to be declared on the label, unless they are considered natural. Presently, many consumers prefer industrially prepared food to have a minimum amount of added emulsifiers and thickeners. It is a problem to find natural ingredients with a functionality which can impart to low fat food dressings in general, and to low fat mayonnaise in particular, a smooth, either spoonable or pourable, rheology.

The solution mentioned in JP 06/054 662 (KAO Corp.) realizes a proper texture by using 1 to 10% of egg, milk or soyabean derived protein, which is dissolved in a water continuous emulsion containing 10 to 60 wt. % of dispersed oil. For maximum thickening, the pH of the dressing is adjusted to the protein's isoelectric point which is, however, much higher than the optimum pH for microbiological stability. When lowering to the optimum pH for microbiological safety, the thickening effect quickly disappears and a dressing results which is too thin. Moreover, the oil droplets of this prior art's dressing should be comminuted so that greater than 80% of them have an extremely small size of less than 1 μm, otherwise no proper texture is obtained.

The article 'Whey protein and the properties of salad dressing' in Deutsche Milchwirtschaft, 1993, 44(21) p. 1054, by G. Muschiolik et al, discusses the effects of pH and salt content on protein-stabilised emulsion systems. It states that the addition of salt has little or no influence on the consistency of systems containing acid, such as salad dressings. From FIG. 3, it is apparent that the addition of salt either before or after high-pressure homogenisation has little effect on the consistency of systems containing acid.

Similar conclusions are reached in the article 'Investigation of the function of whey protein preparations in oil-in-water emulsions' by G. Muschiolik et al, from Proc. Food Macromolecules and Colloids Symposium, 1994, Dijon, which also discusses the effects of pH and salt content on protein-stabilised oil-in-water emulsions.

The article 'Heat stability of oil-in-water emulsions containing milk proteins: effect of ionic strength and pH' by Hunt and Dalgleish, in the Journal of Food Science, Vol. 60, No. 5, 1995, p. 1120 examines the heat-stability of acidic emulsions containing whey protein and KCl.

The present invention seeks to provide a process for preparing an improved aqueous-continuous emulsion.

BRIEF SUMMARY OF THE INVENTION

A process has been found for the preparation of aqueous continuous emulsions, containing 10 to 60 wt. % of dispersed oil. The emulsion contains a protein and less than 5 wt. % of a polysaccharide thickener.

The process comprises the following steps (not necessarily in the indicated order)

a. dispersing or dissolving a protein in either an aqueous phase or an oil phase, b. mixing the aqueous phase and the oil phase so that a coarse emulsion comprising oil droplets results, c. homogenising the emulsion until the size of at least 95% of the oil droplets is less than 5 μm, d. acidifying the emulsion until a pH of from 3.5 to 4.5 is attained, e. adding electrolyte to the emulsion under shear conditions, wherein step c precedes step e, and, in step e, the emulsion has a temperature of from 10 to 55° C.

The electrolyte addition thickens the system by the formation of flocculated oil droplets. Flocculation of oil droplets appears to increase viscosity, and imparts an attractive texture and mouthfeel to the food dressing, by replacing the functionality of both emulsifiers and thickeners.

BRIEF DESCRIPTION OF THE DRAWINGS

FIG. 1 shows the in-mouth breakdown profiles in terms of texture for the dressing of Example 13 and Comparative Example C.

DETAILED DESCRIPTION OF THE INVENTION

Some process steps may be carried out in reverse order, but the homogenisation step preferably precedes the acidification step.

The addition of the electrolyte solution must follow the homogenisation, else no proper viscosity is obtained.

Preferably the acidification step precedes the addition of electrolyte. The temperature of the emulsion is preferably from 10 to 55° C. during the acidification step.

Reversible flocculation of oil droplets, which are stabilised by a protein coating, should be distinguished from irreversible denaturation of protein. It is known that protein denaturation occurs at increased temperatures: this means that the molecular protein structure is changed in an irreversible way. For denaturation to occur, an extended exposure to a temperature of greater than 60° C. is necessary; also, the higher the temperature, the greater the extent of denaturation.

High temperatures, however, are not necessary when employing the present invention. Flocculation is a reversible condition; when the flocculation conditions are removed (for example, the pH is increased sufficiently), the thick rheology disappears.

In the present invention, the addition of electrolyte solution takes place at temperatures of from 10 to 55° C. Flocculation occurs at ambient temperature, but the process proceeds much faster and results in a firmer texture when the temperature is slightly increased. Therefore, the temperature of the emulsion is preferably from 35 to 45° C. during addition of the electrolyte solution.

In general, the greater the processing temperature of the emulsion, the more stable the resulting product.

It is possible to postpone flocculation, even in the presence of electrolyte, by adding the electrolyte ions at a temperature of less than 10° C., and by storing the product at a temperature of less than 10° C. At a temperature of greater than 40° C., flocculation occurs quickly and immediately. The magnitude of the effect will depend on the concentration and type of ions added. The option to postpone flocculation is advantageous, because the emulsion product can be processed and filled into containers at low viscosity. The desired thickened structure is then generated in the container, for example by using microwave heating. Alternatively, the thickening may by effected by the consumer, so that the emulsion can be adapted to a specific purpose: for example, the emulsion is a dressing which is poured as a relatively thin sauce on a hot dish, where it immediately turns into a thick topping.

The protein is selected from the group consisting of plant protein, fruit protein, dairy protein, egg-albumin, blood-albumin, gluten protein (which may be enzymatically-modified), soya protein and mixtures thereof. In principle, all kinds of protein can be employed, provided the protein is able to flocculate in the presence of an electrolyte.

Preferably, the protein is chosen from the group consisting of egg albumin, whey protein, plant protein, such as pea and bean protein, or fruit protein, such as banana and apple protein. The protein is added in either a, more or less, purified form, such as egg albumin, pea or whey protein, or as a crude product, such as banana puree or apple puree. The protein content may differ widely and can be as high as 84 wt. % (pea protein) or as low as 1 wt. % (banana puree). The amount of protein substance should be chosen such that the final mixture contains at least 0.4 wt. % of pure protein. The proper amount of protein is established easily by routine trials. The amount depends on the nature of the protein and on the amount of oil. Lesser amounts of oil require lesser amounts of protein and vice-versa, in order to attain the desired consistency.

Plant protein is suitably admixed as a mousse (puree) obtained e.g. by grinding vegetables or fruit. Plant mousse sometimes has a relative low emulsifying capacity, so it may be necessary to supplement it with an emulsion stabiliser, such as protein, preferably a vegetable or a milk (e.g. whey) protein.

Electrolytes are substances which dissolve in water and form electrically charged particles (ions). Common electrolytes are salts, such as common cooking salt. Suitable electrolytes may contain monovalent anions such as chloride anions, e.g. originating from sodium chloride; preferably, electrolytes are used which ionize in solution with divalent anions (such as sulphate, e.g. originating from sodium sulphate) or with polyvalent anions (such as tripolyphosphate). Such multivalent anions can often be used in a lesser amount than monovalent anions, whilst obtaining the same viscosity. Electrolytes are added in dry form or as an aqueous solution, preferably having a concentration of from 0.1 to 4 wt. %.

When the electrolyte is added, the emulsion has a temperature of from 10 to 55° C., preferably from 35 to 45° C.

Flavour components may be added at any time during the preparation, but coarse ingredients, including herbs and spices, are preferably added after homogenisation. The use of traditional thickeners, particularly polysaccharides, such as starch, modified starch or gum, is superfluous when preparing an emulsion in accordance with the present invention. Nevertheless, less than 5 wt. % of a polysaccharide may be present, as long as it has no adverse effect on the taste or the texture. Preferably less than 1 wt. %, more preferably less than 0.1 wt. %, of a polysaccharide is present in the final product.

The pH of the final composition should be adjusted to be from 3.5 to 4.5, but, for optimum microbiological stability, the pH is from 3.8 to 4.0.

The invention provides an emulsion suitable for preparing dressings with an optimum pH and having the necessary thickness without relying on added polysaccharides or other non-natural ingredients. Moreover, the dressing has a fine taste which resembles traditional dressings.

The invention is further illustrated by the following examples:

General

The thickness of dressings is expressed in Stevens values for relatively thick consistencies and in Bostwick values for relatively thin consistencies. Bostwick values, as well as Stevens values, refer to specific and well known types of yield stress measurement.

It should be noted that an increased thickness is expressed by an increased Stevens value, but by a decreased Bostwick value. For comparison: Bostwick values are in the range of 0 to 24, where a margarine/spread has a value of 0 and a drink-yogurt has a value of 24. Rheologies characterised by yield stress values expressed in $Nm^{-2}$ units are thicker when stress values are higher.

EXAMPLE 1

Whey Protein Based Dressings

Table I shows the ingredients for a whey based dressing. The aqueous phase is made by dissolving the protein in deionised water (65° C.) using a high shear mixer such as a Silverson™ mixer, followed by adding potassium sorbate. Sunflower oil is heated up to 65° C. and mixed with the aqueous phase, for five minutes, to form a coarse "pre-emulsion". A stable emulsion is made by emulsification in a high pressure Crepaco™ 3-piston homogeniser, at a pressure of $1 \times 10^4$ $kNm^{-2}$ (100 bar), for a total of 5 passes through the homogeniser, followed by pasteurisation at 70° C. for 1 to 2 minutes to avoid microbiological spoilage.

The emulsion is cooled down to 10° C., then acidified with 99.9% glacial acetic acid to pH 4. After pH adjustment, the emulsion is kept at a temperature of 10° C. and a NaCl solution is added, until a NaCl concentration of either 2 or 4 wt. % is attained. Table II shows the resulting thick rheologies in comparison to an emulsion which does not containing NaCl.

TABLE I

| INGREDIENTS | wt. % |
| --- | --- |
| Whey protein* | 2.000 |
| Sunflower oil | 40.000 |
| Potassium sorbate | 0.120 |
| Deionised water | 57.880 |

*The whey protein used is a commercially available concentrate, sold under the name 'Lactalbumen 70' and available from Milei, Stuttgart, Germany.

EXAMPLE 2

Whey Protein Based Dressings

Example 1 is repeated but, after pasteurising, the emulsion is maintained at 40° C. for acidification and addition of NaCl. Then the emulsion is stored at 5° C. Table II shows the obtained rheologies.

From Table II, it can be seen that the greater the amount of an electrolyte added, the greater the yield stress measurement of the resultant emulsion.

TABLE II

| Temperature [° C.] when adding acid and NaCl | NaCl [wt. %] | Stress at 5° C. [Nm$^{-2}$] | Rheology type |
|---|---|---|---|
| (example 1) | 0 | 0.5 | thin pourable |
| 10 | 2 | 10.0 | thick pourable |
|  | 4 | 36.0 | soft-spoonable |
| (example 2) | 0 | 0.5 | thin pourable |
| 40 | 2 | 61.0 | spoonable |
|  | 4 | 174.0 | spreadable/ spoonable |

Comparative Example A

Example 2 is repeated but an emulsion with 2.5 wt. % of NaCl is prepared. The preparation is carried out once with the usual NaCl addition following the homogenisation and the acidification steps, and once with the NaCl addition preceding the homogenisation and the acidification steps.

Table III shows the remarkable thicker rheology when NaCl is added after homogenisation.

TABLE III

| NaCl addition | Stress [Nm$^{-2}$] |
|---|---|
| before homogenisation | 30 |
| after homogenisation | 142 |

EXAMPLE 3

Whey Protein Based Dressing

Example 1 is repeated but sodium sulphate is added instead of sodium chloride, to achieve 5000 ppm divalent sulphate ions. Table IV shows the thickening effect on final rheology when ions of an increasing valency are used.

EXAMPLE 4

Whey Protein Based Dressing

Example 1 is repeated but sodium tripolyphosphate is added instead of sodium chloride, to achieve 5000 ppm trivalent polyphosphate ions. Table IV shows the thickening effect on final rheology when ions of an increasing valency are used.

TABLE IV

Effect of ions on the rheology of flocculated dressings

| Ions | % [w/w] | ppm | Valency | Stress [Nm$^{-2}$] at Tan (δ) = 1 |
|---|---|---|---|---|
| Sodium Chloride | 0.82 | 5000 (chloride) | 1 | 4.8 |
| Sodium Sulphate | 0.74 | 5000 (sulphate) | 2 | 32.4 |
| Sodium Tripoly- phosphate | 0.72 | 5000 (poly- phosphate) | 3 | 169.7 |

EXAMPLE 5

Pea Protein Based Dressing

Table V shows the ingredients for a pea protein based dressing. The oil and the protein are mixed with an Ultraturrax™ high shear mixer at a temperature of 22° C. The mixture is emulsified with the water phase while the temperature is kept at 35° C. Potassium sorbate is added. The emulsion is homogenized at 35° C. with a high pressure homogenizer (2×10$^4$/1×10$^4$ kNm$^{-2}$ (200/100 bar)) supplied by APV Gaulin GmbH, Lubeck, Germany. A [D$_{3,2}$]* droplet size of 2 μm is attained. The emulsion, whilst having its temperature of 35° C. maintained, is acidified with vinegar and lactic acid to achieve a pH of 3.9, and has 1.8% NaCl added thereto, whilst stirring. Table VI shows the thickening effect by the change in Stevens value during processing.

*see M. Alderliesten, A Nomenclature for Mean Particle Diameters, Anal. Proc., Vol. 21 (1984) 167–172.

EXAMPLE 6

Banana Protein Based Dressing

Table V shows the ingredients for a banana protein based dressing. The banana is mixed with water and potassium sorbate. After dissolving the available banana protein, oil is added while stirring with an Ultraturrax™ high shear mixer for 5 min. The mixture is emulsified while the temperature is kept at 40° C. The emulsion is homogenised at 35° C. with an APV Gaulin high pressure homogeniser (2×10$^4$/1×10$^4$ kNm$^{-2}$ (200/100 bar)). A [D$_{3,2}$] droplet size of 1.8 μm is attained. The emulsion, whilst having its temperature of 35° C. maintained, is acidified with vinegar and lactic acid to achieve a pH of 3.9, and has 1.8 wt. % of NaCl added thereto, whilst stirring. Table VII shows the thickening effect by the change in Bostwick value during processing.

TABLE V

|  | Pea Ex. 5 | Banana Ex. 6 | Banana Ex 7 |
|---|---|---|---|
| contents in wt. % on composition | | | |
| INGREDIENTS | | | |
| Pisane, pea (protein: 84%) | 2.00 | | |
| Fresh banana (protein: 1%) | | 40.00 | 40.00 |
| Sunflower oil | 40.00 | 10.00 | 25.00 |
| Water | 53.50 | 46.05 | 31 |
| Lactic acid (50% solution) | 0.90 | 0.75 | 0.75 |
| Seasoned vinegar (12%) | 1.60 | 1.50 | 1.50 |
| K-sorbate | 0.20 | 0.20 | 0.20 |
| NaCl | 1.80 | 1.80 | 1.80 |
| ANALYSIS | | | |
| Protein[1] | 1.68 | 0.4 | 0.4 |
| pH | 3.9 | 3.9 | 3.9 |
| [D$_{3,2}$] droplet size (μm) | 2.0 | 1.8 | 2.4 |

Notes
1) Protein content on product resulting from the added pea or banana
2) Measured with a light scattering Helos™ device

TABLE VI

| Stevens value (mayo grid) of homogenized emulsion [g] | Ex. 5 |
|---|---|
| Not acidified (pH 6.5) | 195 |
| After acidification (pH 3.9) | 65 |
| After NaCl addition (pH 3.9) | 142 |

Comparative Example B

A product was prepared with a composition identical to the product of example 6, but without any oil. The preparation was also identical. Table VII shows that no substantial change in Bostwick value occurred when electrolyte was added.

This comparison example clearly shows the positive relation of the presence of oil (droplets) to the flocculation effect.

TABLE VII

| Bostwick value of homogenized emulsion | Ex. 6 | Ex. B |
| --- | --- | --- |
| Not acidified (pH 6.5) | 10.5 | 10.5 |
| After acidification (pH 3.9) | 15 | 22.5 |
| After NaCl addition (pH 3.9) | 6.2 | 24 |

EXAMPLE 7

Banana Protein Based Dressing

A preparation is carried out according to example 6, using the ingredients as indicated in Table V. The main difference is that the amount of oil has been increased from 10 to 25 wt. %. Table VIII shows the thickening effect by the change in Stevens value during processing. The Stevens value (after three days) is 90, which shows a thickness greater than that of the 10% oil dressing of example 6, for which only a Bostwick value could be established.

TABLE VIII

| Stevens value (mayo grid) of homogenized emulsion [g] | Ex. 7 |
| --- | --- |
| Not acidified (pH 6.5) | 95 |
| After acidification (pH 3.9) | 30 |
| After NaCl addition (pH 3.9) | 90 |

EXAMPLES 8 AND 9

Whey Protein Based Dressings

Example 1 is repeated up to the homogenisation step using the ingredients for a whey based dressing shown in Table IX, except that the deionised water and the sunflower oil have a temperature of 60° C., not 65° C. After each pass through the homogeniser, samples are taken for droplet measurement size.

Table X shows the effect of whey concentration and the number of passes at $1 \times 10^4$ $kNm^{-2}$ (100 bar) pressure through the homogeniser on oil droplet size and distribution. The mean droplet size is determined using a Mastersizer from Malvern Instruments Ltd, Malvern, UK, with optical parameters defined by the manufacturer's presentation code 0500: 2 mls of emulsion are added to a large sampling unit filled with 100 ml of deionised water, and measurements are made using a pump and a stirrer setting of 40%.

From Table X, it can be seen that 3 passes through the homogeniser is sufficient for 95% of the oil droplets to have a size of less than 5 $\mu$m when the amount of whey protein is 1 wt. % or 2 wt. %. When the amount of whey protein is 5 wt. %, only 2 passes through the homogeniser are required.

TABLE IX

| INGREDIENTS | Ex. 8 wt. % | Ex. 9 wt. % |
| --- | --- | --- |
| Whey protein* | 1.00 | 5.00 |
| Sunflower oil | 40.00 | 40.00 |
| Potassium sorbate | 0.12 | 0.12 |
| Deionised water | 58.88 | 54.88 |

*The whey protein used is a commercially available concentrate, sold under the name 'Lactalbumen 70' and available from Milei, Stuttgart, Germany.

TABLE X

| Emulsion example | Whey % w/w | Homogenisation Process | | Particle Size Distribution | | |
| --- | --- | --- | --- | --- | --- | --- |
| | | Pressure (kN/m²) | No. of Passes | Mean Size $D_{[3,2]}$ [$\mu$m] | % of Particles | |
| | | | | | below 1 $\mu$m | below 5 $\mu$m |
| 8 | 1 | $1 \times 10^4$ | 0 | 16.74 | 0.4 | 3.3 |
| | | | 1 | 1.65 | 20.3 | 66.8 |
| | | | 2 | 0.89 | 38.0 | 84.8 |
| | | | 3 | 0.89 | 45.2 | 96.1 |
| | | | 4 | 0.76 | 54.9 | 99.3 |
| | | | 5 | 0.70 | 62.1 | 99.9 |
| 1 | 2 | $1 \times 10^4$ | 0 | 30.97 | 0.1 | 0.4 |
| | | | 1 | 1.60 | 22.5 | 71.0 |
| | | | 2 | 0.99 | 38.6 | 83.9 |
| | | | 3 | 0.64 | 56.5 | 97.3 |
| | | | 4 | 0.68 | 62.1 | 99.3 |
| | | | 5 | 0.63 | 68.8 | 99.5 |
| 9 | 5 | $1 \times 10^4$ | 0 | 20.67 | 0.3 | 1.4 |
| | | | 1 | 0.87 | 39.5 | 94.6 |
| | | | 2 | 0.70 | 51.7 | 97.6 |
| | | | 3 | 0.73 | 55.8 | 97.2 |
| | | | 4 | 0.69 | 61.7 | 98.5 |
| | | | 5 | 0.69 | 61.5 | 97.4 |

EXAMPLES 10 AND 11

Whey Protein Based Dressings

Example 2 is repeated but the emulsion is acidified to a pH of 3.5 or 4.5, and NaCl is added to achieve $3 \times 10^4$ ppm chloride ions. The critical stress of the resulting emulsion having a pH of 3.5 and a temperature of 5° C. at tan δ=1 is 363 Nm$^{-2}$ (=363 Pa). The critical stress of the resulting emulsion having a pH of 4.5 and a temperature of 5° C. at tan δ=1 is 200 Nm$^{-2}$ (=200 Pa).

(The critical stress is measured by a Carrimed™ controlled stress rheometer, using parallel plate geometry. The oscillation mode of the rheometer is set at a frequency of 1 Hz and the applied stress is increased linearly from 0.08 Nm$^{-2}$ (=0.08 Pa) to an end stress which is significantly greater than that required to give tan δ=1.)

EXAMPLE 12

Whey Protein Based Dressings

Example 1 is repeated up to the homogenisation step for a whey based dressing shown in Table XI; locust bean gum is added immediately after the potassium sorbate. After homogenisation, the emulsion is cooled to 45° C., acidified with glacial acetic acid to pH 4, and NaCl solution is added until a concentration of 1.5 wt. % is achieved.

A spoonable dressing is obtained having a Stevens value of 22.

TABLE XI

| INGREDIENTS | wt. % |
|---|---|
| Whey protein* | 2.000 |
| Sunflower oil | 40.000 |
| Locust bean gum | 0.070 |
| Potassium sorbate | 0.210 |
| Deionised water | 57.810 |

*The whey protein used is a commercially available concentrate, sold under the name 'Lactalbumen 70' and available from Milei.

EXAMPLE 13

Egg Protein Based Dressing

An egg protein based dressing is prepared using the ingredients shown in Table XII and in accordance with the process described in Example 1; the xanthan gum is dissolved directly in the water without slurrying. The mixture is homogenised at 13790 kNm$^{-2}$ (2000 psi).

Comparative Example C

A traditional dressing is prepared, using the ingredients shown in Table XII, by slurrying the xanthan gum in 10% of the oil, dissolving the remaining ingredients in the water, and adding the xanthan/oil slurry thereto. The mixture is homogenised at 13790 kNm$^{-2}$ (2000 psi).

FIG. 1 shows the in-mouth breakdown profiles in terms of texture for the dressings of Example 13 and Comparative Example C. It can be seen that the dressing of Example 13 has an advantageous faster breakdown in the mouth; this is a consequence of the fact that it contains less thickener (xanthan gum).

The dressing of example 13 has a consistency comparable to that of the dressing of comparative example C, even though it contains a significantly smaller amount of xanthan gum.

TABLE XII

| | Ex. 13 wt. % | Comp. Ex. C wt. % |
|---|---|---|
| INGREDIENTS | | |
| Soyabean oil | 55 | 55 |
| Cultured buttermilk powder | 2.5 | 2.5 |
| Xanthan gum | 0.015 | 0.35 |
| Egg yolk powder | 1.5 | 1.5 |
| Phosphoric chloride | 0.6 | 0.6 |
| Sodium Chloride | 1.6 | 1.6 |
| Vinegar | 0.5 | 0.5 |
| Herbs & spices | 2 | 2 |
| Water | to 100% | to 100% |
| DRESSING PROPERTIES | | |
| Yield stress (Nm$^{-2}$) | 52 | 56 |

We claim:

1. A process for the preparation of an emulsion with a continuous aqueous phase comprising a. dispersing or dissolving a protein in either an aqueous phase or an oil phase
   b. mixing the aqueous phase and the oil phase to produce a coarse emulsion comprising oil droplets
   c. homogenizing the emulsion until the size of at least 95% of the oil droplets is less than 5 μm,
   d. acidifying the emulsion at a temperature of from 10–55° C. until a pH of from 3.5 to 4.5 is attained, and
   e. adding an electrolyte to the homogenized emulsion under shear conditions; to produce an emulsion containing 10–60 wt % of dispersed liquid oil, a protein and less than 5 wt % of a polysaccharide, wherein step c precedes step e and, in step e, the emulsion has a temperature of from 10 to 55° C.

2. Process according to claim 1, wherein the homogenisation step precedes the acidification step.

3. Process according to claim 1, wherein the acidification step precedes the addition of electrolyte.

4. Process according to claim 1, wherein the emulsion has a temperature of from 35 to 45° C. when the electrolyte is added.

5. Process according to claim 1, wherein the protein is selected from the group consisting of dairy protein, plant protein, fruit protein, egg-albumin, blood-albumin, gluten protein (which may be enzymatically-modified), soya protein and mixtures thereof.

6. Process according to claim 5, wherein the plant or fruit protein is added in the form of a mousse of vegetables or fruits.

7. Process according to claim 1, wherein the electrolyte is in the form of a solution and is used in a concentration of from 0.1 to 4 wt. %.

8. Process according to any one of the preceding claims, wherein less than 1 wt. %, of a polysaccharide is present.

* * * * *